(12) United States Patent
Costa et al.

(10) Patent No.: US 10,915,381 B2
(45) Date of Patent: Feb. 9, 2021

(54) SYSTEM AND METHOD FOR COMPUTATIONAL STORAGE DEVICE INTERCOMMUNICATION

(71) Applicant: NGD SYSYEMS, INC., Irvine, CA (US)

(72) Inventors: Hermes Costa, Mission Viejo, CA (US); Vladimir Alves, Tustin, CA (US)

(73) Assignee: NGD Systems, Inc., Irvine, CA (US)

( * ) Notice: Subject to any disclaimer, the term of this patent is extended or adjusted under 35 U.S.C. 154(b) by 0 days.

(21) Appl. No.: 16/653,428

(22) Filed: Oct. 15, 2019

(65) Prior Publication Data

US 2020/0117518 A1      Apr. 16, 2020

Related U.S. Application Data

(60) Provisional application No. 62/746,357, filed on Oct. 16, 2018.

(51) Int. Cl.
| | |
|---|---|
| *G06F 3/00* | (2006.01) |
| *G06F 9/54* | (2006.01) |
| *G06F 3/06* | (2006.01) |
| *G06F 13/10* | (2006.01) |
| *G06F 13/16* | (2006.01) |

(52) U.S. Cl.
CPC ............. *G06F 9/542* (2013.01); *G06F 3/067* (2013.01); *G06F 3/0619* (2013.01); *G06F 3/0659* (2013.01); *G06F 3/0673* (2013.01); *G06F 9/546* (2013.01); *G06F 13/102* (2013.01); *G06F 13/1668* (2013.01)

(58) Field of Classification Search
CPC ............................... G06F 9/54; G06F 9/44521
USPC .......................................................... 719/310
See application file for complete search history.

(56) References Cited

U.S. PATENT DOCUMENTS

| | | | |
|---|---|---|---|
| 8,819,335 B1 | 8/2014 | Salessi et al. | |
| 9,021,189 B2 | 4/2015 | Salessi | |
| 9,092,321 B2 | 7/2015 | Salessi | |
| 10,176,092 B2 | 1/2019 | Alcantara et al. | |
| 2011/0296076 A1* | 12/2011 | Hu | G06F 13/385 710/316 |
| 2016/0315881 A1* | 10/2016 | Pierson | H04L 69/22 |

OTHER PUBLICATIONS

Frazer Bennett, Piconet: Embedded mobile networking. (Year: 1997).*

* cited by examiner

*Primary Examiner* — Lechi Truong
(74) *Attorney, Agent, or Firm* — Lewis Roca Rothgerber Christie LLP

(57) ABSTRACT

A method of facilitating communication to an embedded computer in a computational storage device via a host includes receiving a message for transmission to an embedded process running at the embedded computer, determining that a destination address of the message corresponds to the embedded computer within the computational storage device, in response to the determination, forwarding the message to a host relay process associated with the embedded computer, and encapsulating the message to generate a proprietary command for transmission to the computational storage device.

16 Claims, 6 Drawing Sheets

SYSTEM AND METHOD FOR COMPUTATIONAL STORAGE DEVICE INTERCOMMUNICATION

CROSS-REFERENCE TO RELATED APPLICATION(S)

This application claims priority to, and the benefit of, U.S. Provisional Application No. 62/746,357 ("SYSTEM AND METHOD FOR COMPUTATIONAL STORAGE DEVICE INTER COMMUNICATION"), filed on Oct. 16, 2018, the entire content of which is incorporated herein by reference.

This application is related to a U.S. patent application Ser. No. 16/653,419 entitled SYSTEM AND METHOD FOR OUTWARD COMMUNICATION IN A COMPUTATIONAL STORAGE DEVICE, filed on Oct. 15, 2019, and related to a U.S. patent application Ser. No. 16/653,431 entitled SYSTEM AND METHOD FOR COMMUNICATING BETWEEN COMPUTATIONAL STORAGE DEVICES, filed on Oct. 15, 2019, the entire content of all of which is incorporated herein by reference.

This application is also related to U.S. Pat. No. 8,819,335 ("SYSTEM AND METHOD FOR EXECUTING MAPREDUCE TASKS IN A STORAGE DEVICE"), issued on Aug. 26, 2014; U.S. Pat. No. 9,021,189 ("SYSTEM AND METHOD FOR PERFORMING EFFICIENT PROCESSING OF DATA STORED IN A STORAGE NODE"), issued on Apr. 28, 2015; U.S. Pat. No. 9,092,321 ("SYSTEM AND METHOD FOR PERFORMING EFFICIENT SEARCHES AND QUERIES IN A STORAGE NODE"), issued on Jul. 28, 2015; and U.S. Pat. No. 10,176,092 ("SYSTEM AND METHOD FOR EXECUTING DATA PROCESSING TASKS USING RESILIENT DISTRIBUTED DATASETS (RDDS) IN A STORAGE DEVICE"), issued on Jan. 8, 2019, the entire contents of which are incorporated herein by reference.

FIELD

Aspects of embodiments of the present invention are generally related to computational systems and storage devices.

BACKGROUND

A computer is an electronic machine that receives input data, executes a predefined series of logical and mathematical operations (software) and generates outputs. Computers can generally execute several software entities/processes at the same time. One such software process is the kernel, which administrates the use of the memory, CPU, and internal data buses by the other software entities. The kernel, along with other software processes, makes up the operating system of the computer, and those software entities that make use of the operating system are called user processes. Pieces of the kernel that are designed to interface with devices are called device drivers. When a user process needs to access a device, it talks to the kernel, which uses the device driver to interact with the device through the internal data bus.

To enable a computer to communicate to (e.g., exchange data with) another peer computer, a common set of rules are followed by each peer computer involved, which are referred to as network protocols. The ubiquitous data transmission protocol used by commercial computer systems is the Internet protocol Suite also known as the TCP/IP protocol family.

A network device is a device that is connected to the internal data bus and to an external transmission medium in order to exchange messages with another computer (e.g., an external device). A computer may be connected to several different types of network devices at the same time, and the kernel handle the routing of messages to the appropriate network device based on the message's destination address (e.g., TCP/IP destination address).

A storage device contains a storage media that can be of several different types such as flash memory banks, magnetic or optical disks, magnetic tape, etc. Inside the storage device is a controller unit that processes the commands received from the CPU and is responsible for locating the data inside the storage media, reading and writing data into the storage media, and transferring it to and from the internal data bus.

Storage devices are usually connected to a data bus inside the host computer. Some data buses have external physical interfaces but in those cases, they act as an extension of the internal data bus. The data interface between a storage device and a host computer is used to send commands from the host CPU to the storage device controller and transfer raw data between the computer's memory and the storage media. Some examples of interfaces used by some commercial storage devices include serial advanced technology attachment (SATA), non-volatile memory express (NVMe), Fibre Channel (FC), and serial attached scsi (SAS).

The above information disclosed in this Background section is only for enhancement of understanding of the present invention, and therefore it may contain information that does not form the prior art that is already known to a person of ordinary skill in the art.

SUMMARY

Aspects of embodiments of the present invention are directed to system and method for facilitating computational storage device intercommunication with a host computer, an external network device, and/or another computational storage device.

According to some embodiments of the present invention, there is provided a method of facilitating communication to an embedded computer in a computational storage device via a host, the method including: receiving, by a host kernel of the host, a message for transmission to an embedded process running at the embedded computer; determining, by the host kernel, that a destination address of the message corresponds to the embedded computer within the computational storage device; in response to the determination, forwarding, by a host pseudo network device driver of the host, the message to a host relay process associated with the embedded computer; and encapsulating the message, by the host relay process, to generate a proprietary command for transmission to the computational storage device.

In some embodiments, the message is from a host user process local to the host.

In some embodiments, the method further includes: receiving, by the host relay process of the host, a message from a network device communicatively coupled to an external device; and storing, by the host relay process, the message to a host memory and notifying a host pseudo network device driver of availability of the message.

In some embodiments, the network device is communicatively coupled to the external device via a communications network.

In some embodiments, the message is generated by an external user process at the external device and includes the destination address and data to be processed by the embedded computer.

In some embodiments, the method further includes: identifying a block device driver of the host that is associated with the embedded computer; and sending the proprietary command to the block device driver for transmission to an interconnect of the host.

In some embodiments, the interconnect is configured to convert the proprietary command into electrical signals for transmission to the computational storage device via a transmission medium.

In some embodiments, the encapsulating the message includes: reformatting the message as the proprietary command to be compatible with a communication protocol of the host and the computational storage device.

In some embodiments, the proprietary command is configured to instruct a storage controller of the computational storage device to transmit the message to the embedded computer and not to perform any standard read or write command for transmission of data from or to a storage media of the computational storage device.

In some embodiments, the embedded computer is integrated within the computational storage device.

In some embodiments, the message includes a destination address of the embedded computer and data to be processed by the embedded computer.

In some embodiments, the host pseudo network device driver is a native feature of the host kernel, and the host relay process resides at a user space level of a host operating system.

In some embodiments, the determining that the destination address of the message corresponds to the embedded computer includes: identifying, by the host kernel, the destination address of the message; and cross-checking, by the host kernel, the destination address against a look-up table internal to the host.

In some embodiments, the encapsulating the message includes: stripping, by the host relay process, unused portions of the message, concatenating more than one message into one or fragmenting one message into multiple messages; and reformatting, by the host relay process, the stripped message into the proprietary command that is compatible with a communication protocol of the host and the computational storage device.

According to some embodiments of the present invention, there is provided a method of facilitating communication from a host to an embedded computer in a computational storage device, the method including: receiving, by a storage controller of the computational storage device, a message through a transmission medium; determining, by the storage controller, whether a destination address of the message corresponds to the embedded computer or a storage media of the computational storage device; in response to determining that a destination of the message is the embedded computer: sending, by the storage controller, a signal that a message is available to an embedded relay process associated with the embedded computer, and writing the message to an operational memory of the computational storage device; and forwarding, by the embedded relay process, the message to an embedded pseudo network device driver of the embedded computer for transmission to an embedded user process of the embedded computer.

In some embodiments, the embedded computer is integrated within the computational storage device.

In some embodiments, the message includes the destination address associated with the embedded computer and data to be processed by the embedded computer.

In some embodiments, the determining the destination address of the message includes: identifying, by an embedded kernel, the destination address of the message; and cross-checking, by the embedded kernel, the destination address against a look-up table internal to the computational storage device.

In some embodiments, the embedded pseudo network device driver is a native feature of a host kernel of the embedded computer, and the embedded relay process resides at a user space level of an operating system of the embedded computer.

In some embodiments, the message is generated by a host user process at the host.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

The detailed description set forth below is intended as a description of example embodiments of a system and method for defect detection, provided in accordance with the present invention, and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

A computational storage device can be viewed as a common storage device that has an embedded computer integrated within it. Generally, moving data is an expensive operation (in terms of time and energy) and it is desirable to shift processing close to where the data is stored. For example, when running a search, normally, the data on the storage device would have to be moved over to the host, and searched on the host. However, with embedded computing, one can send the inquiry to the storage device itself, and have the embedded computer perform the search, and simply return the result. Thus, it is desirable for the embedded computer inside the storage device to gather external data or to provide data to the outside world. However, due to physical limitations, the only available external interface may be the one that connects the storage device's controller to the host computer.

Some embodiments of the present invention provide a solution for data communication for the computational storage device that uses a pseudo network interface to encapsulate messages and transmit them through the local physical connection between the storage device and the host computer. Some embodiments of the present invention enable communication with the embedded computer inside the storage device using an existing network protocol in a transparent way, as if the communication is between computers connected through a transmission network.

According to some embodiments, the host computer that is connected to a computational storage device sees two interfaces: one that is a conventional storage device driver interface, and another that is a pseudo network interface. The pseudo network interface may act as conventional network device interface, but instead of being physically connected to an external data network, the data is sent to a relay process that writes it into the storage device interface.

Figure 1:
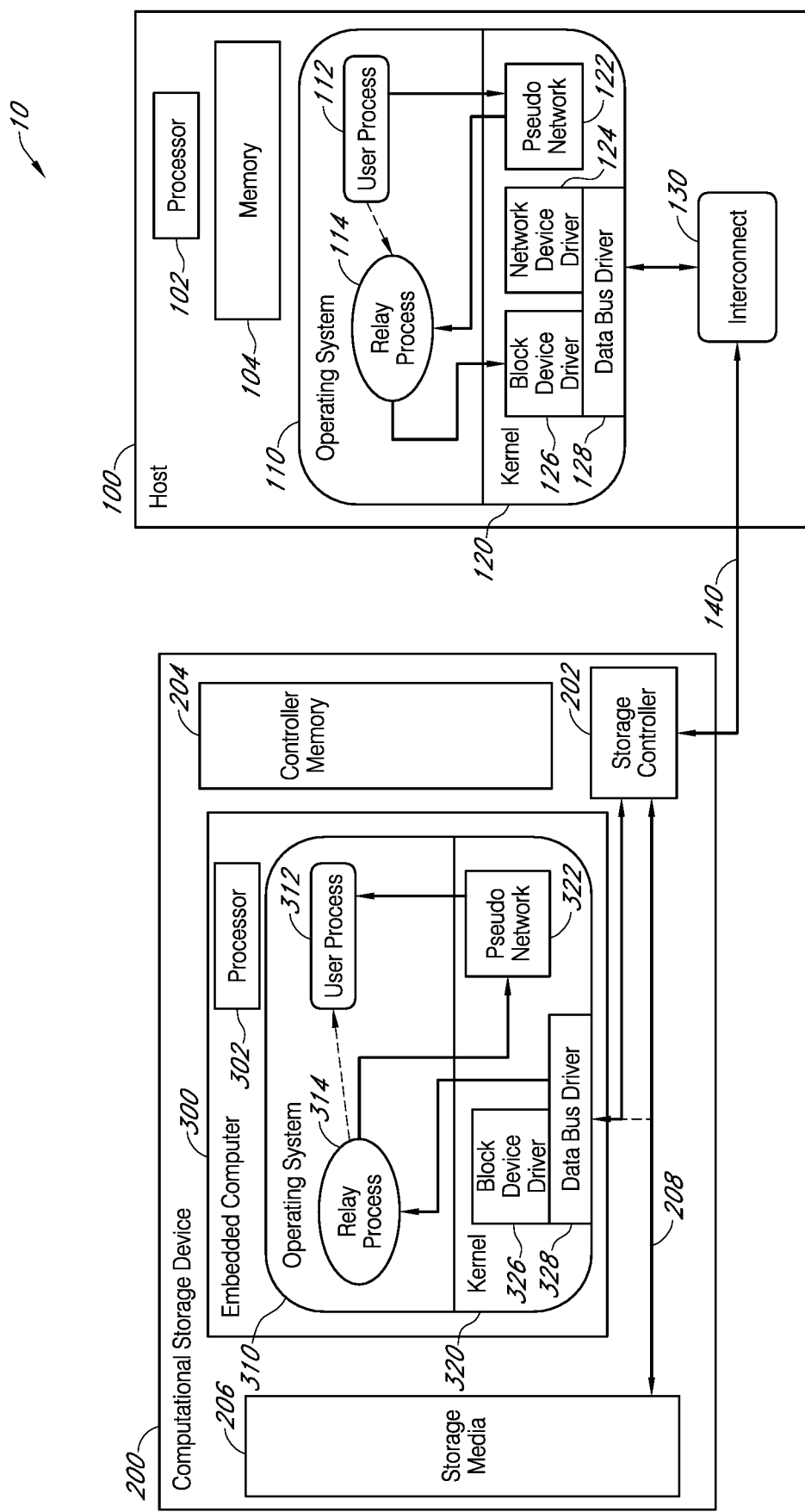
FIG. 1 is a block diagram illustrating a computational system including a host in communication with a computational storage device, according to some example embodiments of the present invention.

FIG. 1 is a block diagram illustrating a computational system 10 including a host 100 in communication with a computational storage device 200, according to some example embodiments of the present invention.

Referring to FIG. 1, the host (e.g., host computer) 100 includes a host processor 102 and a host memory 104. The host processor 102 performs the logical and mathematical operations of the software code, which may be at least partially stored at the host memory 104. The host processor and memory 102 and 104 together store (or at least partially store) and run the operating system 110, a main part of which is the host kernel 120. The host kernel 120 administrates the use of the host processor and memory 102 and 104, and internal data buses by the other software entities (e.g., processes). The host kernel 120 includes a host pseudo network device driver 122 (also referred to herein as "host pseudo network" or "host pseudo network interface"), a network device driver 124, a block device driver (e.g., storage device driver) 126, and a data bus driver 128 that are capable of interfacing with different devices within and external to the host 100. When the host user process 112 needs to access a device, such as the computational storage device 200, the host user process 112 communicates with the host kernel 120, which uses the appropriate device driver (e.g., the data bus driver 128) to interact with the device.

The host user process 112 is a process executed by the host processor 102, which resides at the user space level of the operating system and is initiated by a user (e.g., any custom application running on the operating system 110). The host user process 112 may write data to the host memory 104 and/or to the computational storage device 200. The host user process 112 may view the storage device 200 as a block device driver 126, and may send a write command to the computational storage device 200 indicating the memory address where the data to be written is located. Commands may be exchanged between the block device driver 126 and the data bus driver 128. The interconnect (e.g., a bus interconnect or switch, such as a PCIe interconnect) 130 is configured to deliver the command/message to the appropriate device (e.g., the computational storage device 200). The block device driver 126 may be an interface (e.g., a software interface) that controls and transfers data to and from a physical storage device such as a hard disk, a magnetic tape driver, an optical DVD driver, etc.

The host 100 and the computational storage device 200 are separate computational entities but are communicatively coupled via a transmission medium 140 (e.g., coaxial cable, twisted pair, optical fiber, radio, PCIe bus, etc.). the storage device includes a storage controller 202 for managing operations of the computational storage device 200, and internal operational memory (also referred to as controller memory) 204 for temporary storage of internal data generated by the storage controller 202, and a storage media 206 for storing data (e.g., data from the host 100) in a persistent (i.e., non-volatile) way. The storage controller 202 processes the commands received from the host 100 and is responsible for locating the data inside the storage media 206, reading and writing data into the storage media 206, and transferring the data to and from the internal data bus 208. In some embodiments, the storage media 206 and the embedded computer 300 are electrically coupled to the storage controller 202 through the same data bus 208 (e.g., shown as a dashed line connecting to a solid line in FIG. 1) or through two separate electrical connections (e.g., shown as two separate lines in FIG. 1). In some examples, the controller memory 204 may be a volatile memory, such as dynamic random access memory (DRAM), and the storage media 206 may be non-volatile memory, such as NVDIMM or flash memory.

When the storage controller 202 receives a write command from the host 100, the data in the host memory 104 is written into the controller memory 204. The storage controller 202 then stores the data written to the controller memory 204 in the storage media 206. Inversely, when the host user process 112 issues a read command to the block device driver 126, data from the storage media 206 is written to the host memory 104.

According to some embodiments, the computational storage device 200 includes an embedded computer 300, which is an electronic machine that receives input data, executes a predefined series of logical and mathematical operations (software) and generates outputs. The embedded computer 300 is internal to, and electrically integrated with (e.g., on the same silicon as), the computational storage device 200. The embedded computer 300 may be designed for data operations or analytics, such as search and analysis of a large volume of unstructured data. The embedded computer 300 may include, for example, a reconfigurable digital signal processing (DSP) core containing arithmetic and logic units and other dedicated hardware units that may be used to perform data analytics, and other operations such as compression, decompression, encryption, and decryption. In one embodiment, the embedded computer 300 includes a processor 302, which may be an ARM-based core or any other central processing unit (CPU), and a flash memory. These additional cores and circuitry within the silicon of the computational storage device 200 occupy a small area and as a result consume little power. Although these functions could also be performed on a server CPU, such a CPU, being a general purpose CPU, will generally consume significantly more power. Moreover, transferring data over a data bus and across the interface (e.g., the transmission medium 140) to the storage node consumes a significant amount of power.

By designing and/or integrating the silicon of the embedded computer 300 to perform the desired functions, their execution can be made significantly more power-efficient.

In some embodiments, the embedded computer 300 performs querying of data. For example, a query may consist of a request (e.g., from a host user process 112) to find a text word, and/or the number of occurrences of that text word in the computational storage device 200. According to some embodiments, instead of reading the entire content of the storage media 206 into the host processor 102 and counting the number of matches, which may be an energy intensive and potentially time consuming process, the task can be computed locally within the computational storage device 200, which may reduce or substantially reduce the transmission energy cost and processing time of the query. While this process is illustrated with reference to a query, a similar process enables data analytics, decryption, and other such operations to be performed on the computational storage device 200 itself. In addition to pattern matching, word count, and occurrence count, the embedded computer 300 may run a general purpose operating system. The ability to run a fully functional, general purpose, operating system on the embedded computer 300 may enable the computational storage device 200 to perform sophisticated analyses of historical data, and also to run advanced algorithms for predictive analysis, including the use of Artificial Intelligence algorithms for advanced data analysis.

According to some embodiments, the host pseudo network 122 and the host relay process 114 enable communication between the host 100 and the embedded computer 300 by encapsulating messages for transmission through the local connection (e.g., the transmission medium 140) between the two entities. The host pseudo network 122 may be a pre-existing feature (e.g., a native feature) of the host kernel 120, and the host relay process 114 may be a piece of software installed on the operation system 110 of the host 100. Together, the host pseudo network 122 and the host relay process 114 facilitate the intercommunication between user processes 112 and 312 on the host 100 and the embedded computer 300 using existing communication protocols and existing transmission medium 140 (e.g., PCIe bus, coaxial cable, twisted pair, or optical fiber already connecting the host 100 and the computational storage device 200) and without the need for kernel customization or hardware modifications. Additionally, the communication flow facilitated by the host pseudo network 122 and the host relay process 114 is completely transparent to the host user process 112, that is, the host user process 112 does not need to have any awareness of fact that the embedded user process 312 of the embedded computer 300, which it is communicating with, is within the computational storage device 200.

In some embodiments, when a host user process 112 generates a message for transmission to the embedded computer 300, the host pseudo network 122 acts as a conventional network device interface, but rather than sending the message to an external data network, the host pseudo network 122 is configured to send the message to a host relay process 114 that writes it into the storage device interface (e.g., the block device driver 126). In effect, the host pseudo network 122 simulates a network device that is virtually connected to a similar pseudo network device driver (i.e., the embedded pseudo network device driver) inside the embedded computer 300 of the computational storage device 200. The host relay process 114 encapsulates the message such that when the storage controller 202 receives the encapsulated message it knows to rely it to the particular embedded user process 312. Herein, a message refers to a data communication between two computing entities on a network, and may include instructions for the receiving computing entity to perform.

Figure 2A:
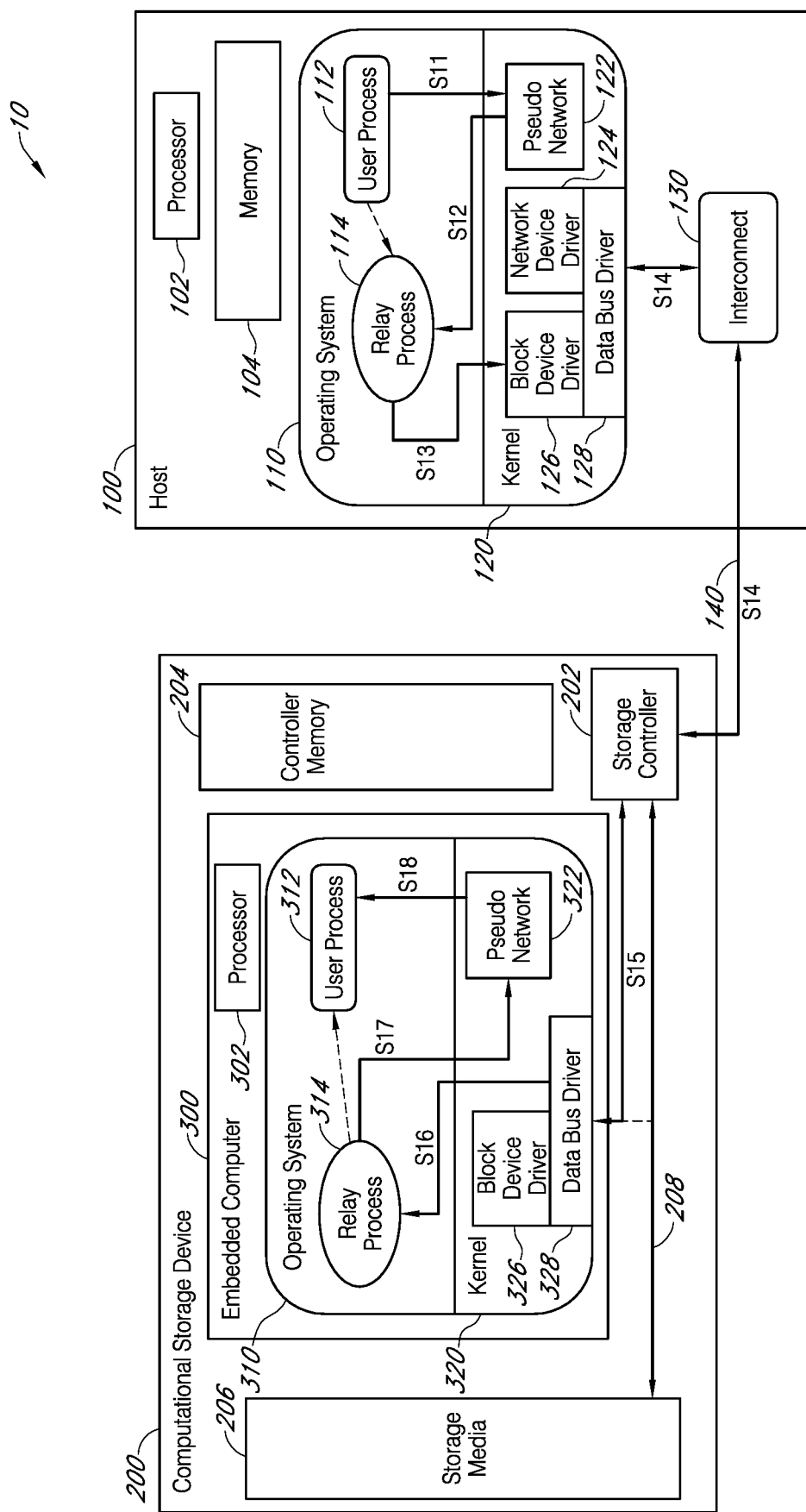
FIG. 2A illustrates a data communication flow from the host to an embedded computer in the computational storage device, according to some example embodiments of the present invention.

FIG. 2A illustrates a data communication flow from the host 100 to an embedded computer 300 in the computational storage device 200, according to some example embodiments of the present invention.

Referring to FIG. 2A, when a host user process 112 writes a message to a process running in the embedded computer 300 inside the computational storage device 200, the host user process 112 issues a send command (i.e., a "send message" command) to the host kernel 120. The message may include a destination address (e.g., corresponding to the embedded computer 300), and user data and/or instructions to be executed by another processing node (e.g., the embedded computer 300). When the destination address of the message matches the address of (e.g., is associated with an entity internal to) the embedded computer 300, the host kernel 120 forwards the send command to the host pseudo network 122 (S10). The host pseudo network 122 is configured to deliver messages having a destination address corresponding to the embedded computer 300 to the host relay process 114, which may reside at the user space level of the operating system 110 (S12). The host relay process 114 encapsulates the message and issues a vendor specific command to the block device driver 326 associated with the embedded computer 300 (S13). In encapsulating the message, the host relay process 114 may strip unnecessary/unused portions of the message such as certain physical addresses not used by the communication flow (e.g., portions not used by the interconnect 130), may fragment the message into smaller pieces or concatenate several messages to better fit the size of the physical transmission medium, and may reformat the message into a proprietary command, also referred to as a vendor-specific command, that is compatible with the host and storage device software communication protocol (e.g., NVMe) and which, when received by the storage controller 202, instructs the storage controller 202 to relay the message to the embedded computer 300, and not the storage media 206 (as would be the case for a conventional read or write command to a storage device). The vendor specific command may refer to a particular command that is not part of the predefined list of commands of an interface standard (e.g., NVME), but rather is defined and implemented by a manufacturer in proprietary manner that may be specific to the device in which it is implemented. The host relay process 114 forwards the encapsulated message (i.e., the vendor-specific command) to a block device driver 126 corresponding to the computational storage device 200 (e.g., corresponding to the embedded computer 300), which is responsible for making the proprietary vendor-specific command reach the storage controller 202 appropriately. The data bus driver 128 is configured to convert data, commands/messages into signals for transmission to the computational storage device 200 via the interconnect 130 and the transmission medium 140 (S14).

Once the message is received by the storage controller 202, it determines the destination of the message as either the embedded computer 300 or the storage media 206 based on the type of command received from the host's block device driver 126. For example, the destination may be the storage media 206 when the received command is a non-proprietary write command, and may be the embedded computer 300 when the command is a predefined proprietary vendor-specific command created for transferring messages to the embedded computer 300. In the latter case, in some embodiments, the storage controller 202 writes the message to the operational memory 204, and sends a signal to the embedded relay process 314 of the embedded computer 300 (S16) indicating that a message is available to be read. According to some examples, a signal may be a software interruption, which is a kernel mechanism to send event notifications to user processes or between user processes such as the relay process, or a signal may be a predefined memory address that is used by two processes to notify each other using a mechanism of set/reset. That is, when a first process wants to notify that a message is ready, it sets a value on that memory address, and a second process monitors (e.g., continually monitors) that memory address to know when the message is available. After reading the message, the second process resets the value of the memory address, and the first process checks the memory address for the reset, so that it knows that it can send new notifications. According to some examples, the storage controller 202 does not change the message in any way, and the all formatting is performed by the two relay processes on each side of the communication path. The embedded relay process 314, after stripping down, reassembling or breaking down the message or messages to its original format, then delivers the message to the embedded pseudo network device driver 322 of the embedded computer. The embedded pseudo network device driver 322 (also referred to herein as "embedded pseudo network") provides the message transparently to the embedded user process 312 the same way it would have been received from an actual network device.

According to some embodiments, while the host 100 may send messages to the embedded computer 300 unilaterally (e.g., without first receiving permission from, or a data request from the embedded computer 300), the embedded computer 300 does not unilaterally send data to the host 100. That is, in some embodiments, the embedded computer 300 first indicates the presence of data to the host 100, then waits to receive a data request from the host 100, and finally transmits the data to the host in response to the host's data request. This may be done so that the transmission of a message from the embedded computer 300 to the host 100 may be done in compliance with existing communication protocols, and without the need to modify existing protocols or devise new communication protocols. This is further described with reference to FIG. 2B.

Figure 2B:
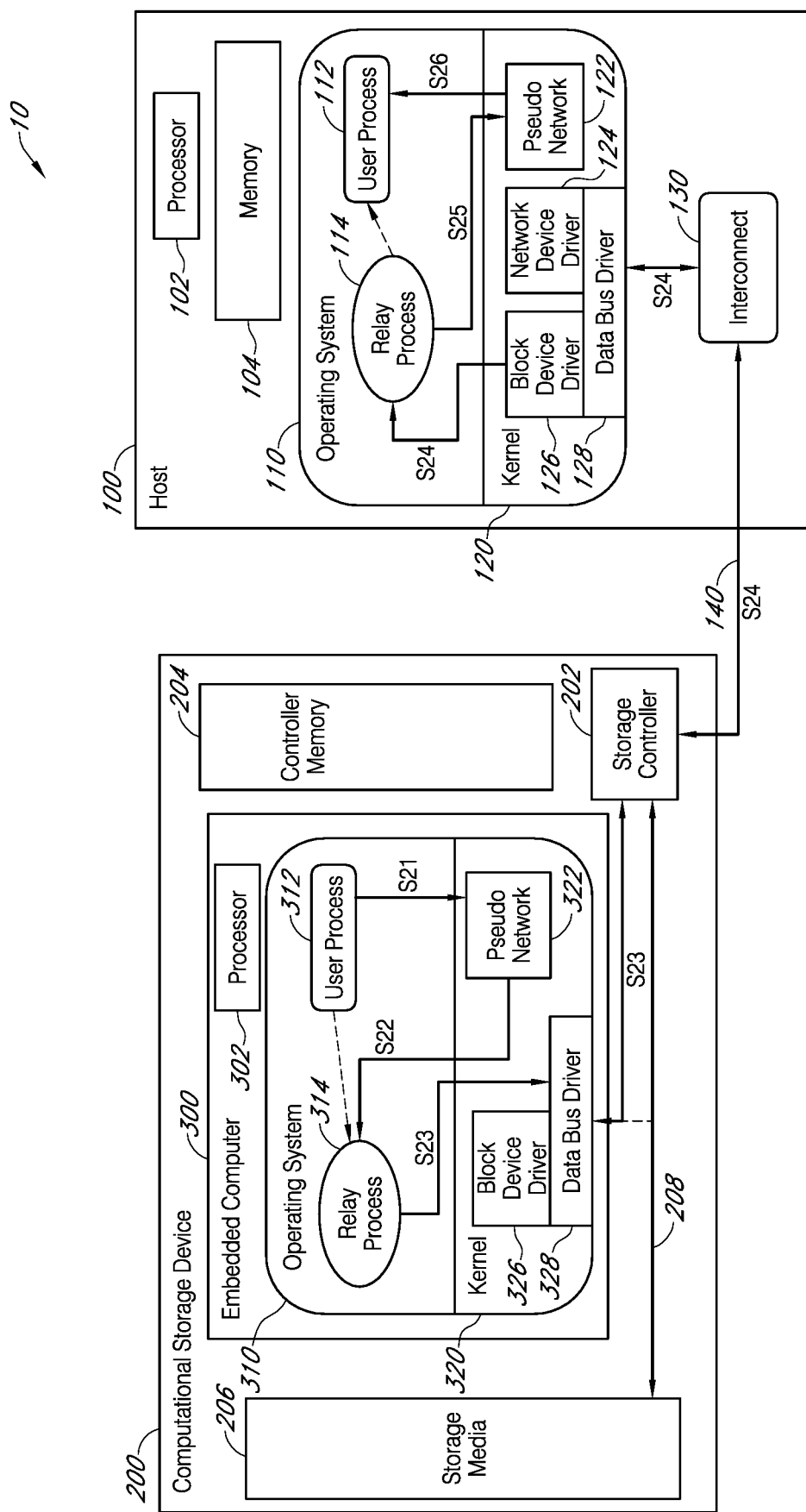
FIG. 2B illustrates a data communication flow from the embedded computer in the computational storage device to the host, according to some example embodiments of the present invention.

FIG. 2B illustrates a data communication flow from the embedded computer 300 in the computational storage device 200 to the host 100, according to some example embodiments of the present invention.

Referring to FIG. 2B, in some embodiments, an embedded user process 312 in the embedded computer 300 generates a message to a process running in the host 100 and issues a send command to the embedded kernel 320 of the embedded computer 300. The embedded kernel 320 determines, based on the destination address of the message, whether to forward the message locally to another process in the same embedded computer, or the embedded pseudo network 322. When the destination address matches that of the host 100 (e.g., the destination address is local to (e.g., is associated with a an entity internal to) the host 100), or if the host 100 was designated as the default route for all messages with a foreign destination address, the embedded kernel 320 forwards the message to the embedded pseudo network 322 (S21). The embedded pseudo network 322 is configured to forward a message with a destination address of the host 100 to the relay process 314 (S22).

According to some embodiments, rather than unilaterally sending the message to the host 100 (via the data bus device driver 328 and the transmission medium 140), the relay process 314 first utilizes the data bus device driver 328 to instruct the storage controller 202 about the message to be delivered (S23). The storage controller 202 then notifies the host relay process 114 on the host 100 of the presence of a new message, waits to receive a send message request from the host 100, and then transmits the message to the host 100 (S24). In some embodiments, the storage controller 202 utilizes the preexisting asynchronous event reporting (AER) feature (e.g., the NVME's AER command) to notify the host 100 that a new message is available. It is also possible that the storage controller is implemented with a nonstandard vendor-specific command that will signal the host, with a specific predefined completion result, whether there is available message to be read, and the host 100 would periodically check for messages by issuing this command and checking the completion result. This causes the host 100 to initiate the action to read the available message or messages from the embedded computer 300. In this way, the transmission of a message from the embedded computer 300 to the host 100 may be done in a manner that is compatible with and in compliance with existing communication protocols.

The notification of available message from the embedded computer 300 will reach the host relay process 114 at the host 100. Using a nonstandard vendor-specific command, it reads the message from storage controller 202 (S24), writes it to the host memory 104 and notifies the embedded pseudo network 122 about the new available message (S25).

The embedded pseudo network 122 checks the destination address of the message with the host kernel 120 (e.g., checks the address against a forwarding/routing table at the kernel host 120 that maps network addresses to physical (or virtual/pseudo) network interfaces and indicates where to send network messages). If the destination address is a local address that belongs to the host 100 (which is the case here), the message is delivered transparently to the appropriate host user process 112 in the same manner as any message received via an actual network device (S26). Here, the network device driver 124 signals the host user process 112 to retrieve the message from the host memory 104. In some examples, the network device driver 124 may send a pointer to the user process, which points to the location within the host memory 104 that the message is stored. The host 100 may have a number of the host user processes, and the destination address may identify a particular one of the host user processes.

According to some embodiments, the embedded computer 300 is also capable of communicating with devices on an external network. Communication with such network devices may occur with the host 100 acting as an intermediary or router.

Figure 3A:
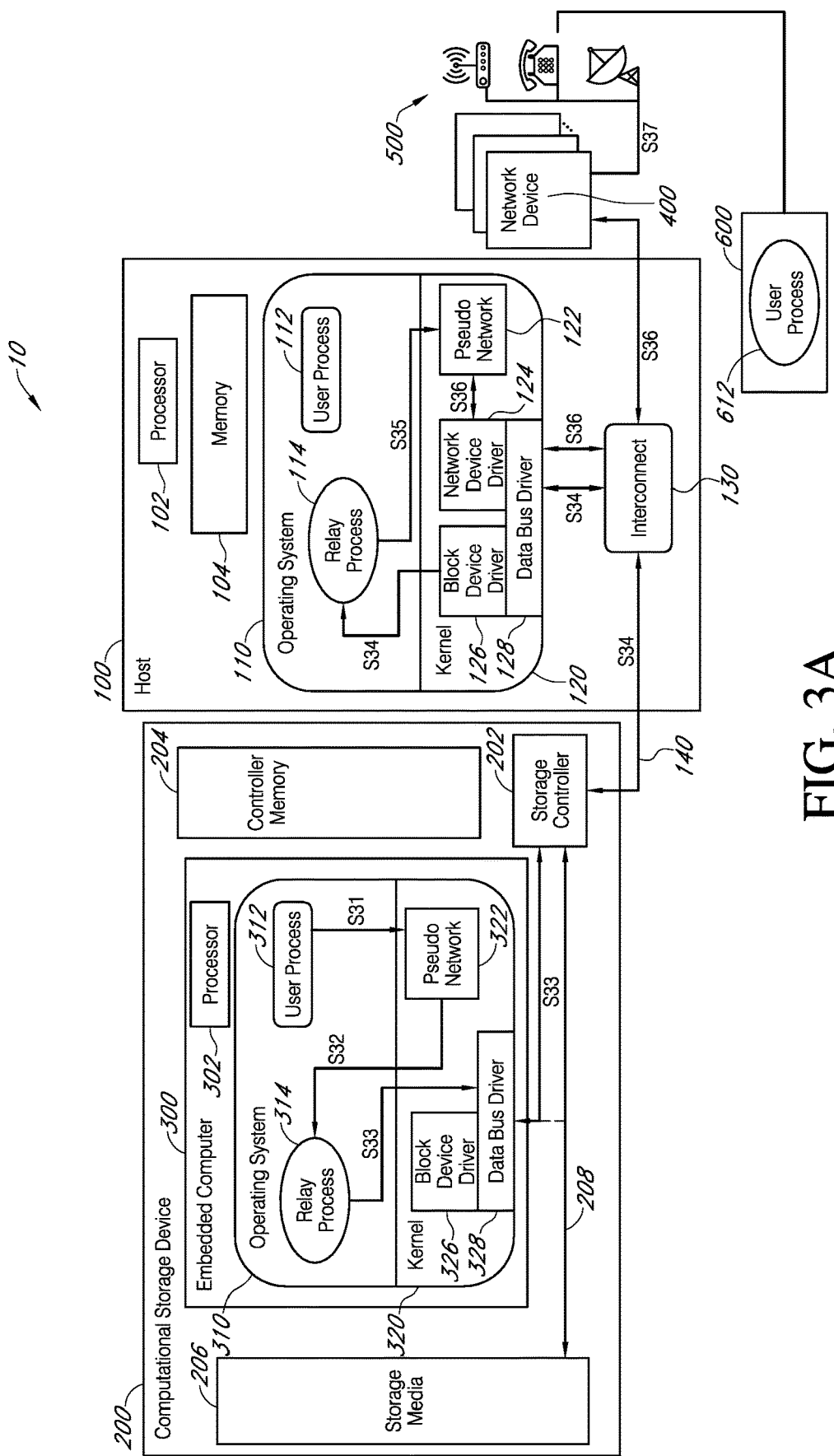
FIG. 3A illustrates a data communication flow from the embedded computer in the computational storage device to an external network device, according to some example embodiments of the present invention.

FIG. 3A illustrates a data communication flow from the embedded computer 300 in the computational storage device 200 to an external network device 400, according to some example embodiments of the present invention.

Referring to FIG. 3, in some embodiments, an embedded user process 312 in the embedded computer 300 generates a message to an external process 612 running at the external device 600 and issues a send command to the embedded kernel 320 of the embedded computer 300 (S31). The destination address of such a message corresponds to that of the external device 600 and thus does not match any address that is local to (e.g., is associated with an entity internal to) the computational storage device 200 or the host 100. As such, the destination address of the message may be unknown to the embedded kernel 320 (e.g., the destination address may not match any entry in a look-up table within the embedded kernel 320). According to some embodiments, the embedded kernel 320 is configured such that it forwards any message with an unknown destination address to the host 100. In other words, the host 100 may act as a default gateway for non-local messages. In the example of the message to the external device 600, the embedded kernel 320 forwards a send command to the embedded pseudo network 322, which then forwards the message to the embedded relay process 314 (S32). The embedded relay process 314 in turn utilizes the embedded data bus device driver 328 to instruct the storage controller 202 about the message to be delivered (S33).

The storage controller 202 then notifies the host relay process 114 on the host 100 of the presence of a new message, waits to receive a send message request from the host 100, and then transmits the message to the host 100 (S34). In some embodiments, the storage controller 202 utilizes the preexisting asynchronous event reporting feature (e.g., the NVME's AER command) to notify the host 100 that a new message is available. This causes the host 100 to initiate the action to read the available message or messages from the embedded computer 300. In this way, the transmission of a message from the embedded computer 300 to the host 100 may be done in a manner that is compatible with and in compliance with existing communication protocols.

The host relay process 114 reads the message from storage controller 202, writes it to the memory 104 and notifies the host pseudo network 122 of the availability of the new message (S35).

The host pseudo network 122 checks the destination address of the message with the host kernel 120. As the message was intended for external device 600, which is external to the host 100, its destination address will not match any of the local addresses of the host 100. Therefore, the host kernel 120 then determines which network device 400 the message should be routed to, and identifies the particular network device 400 that matches the destination address and routes the message to the device driver of that particular network device 400 (S36), which finally transmits the message to the external device 600, for example through the communications network 500 (S37). The communications network 500 may include a private or public switched telephone network (PSTN), local area network (LAN), private wide area network (WAN), and/or public wide area network such as, for example, the Internet. The communications network 500 may also include a wireless carrier network including a code division multiple access (CDMA) network, global system for mobile communications (GSM) network, and/or any 3G, 4G, or 5G network conventional in the art.

Figure 3B:
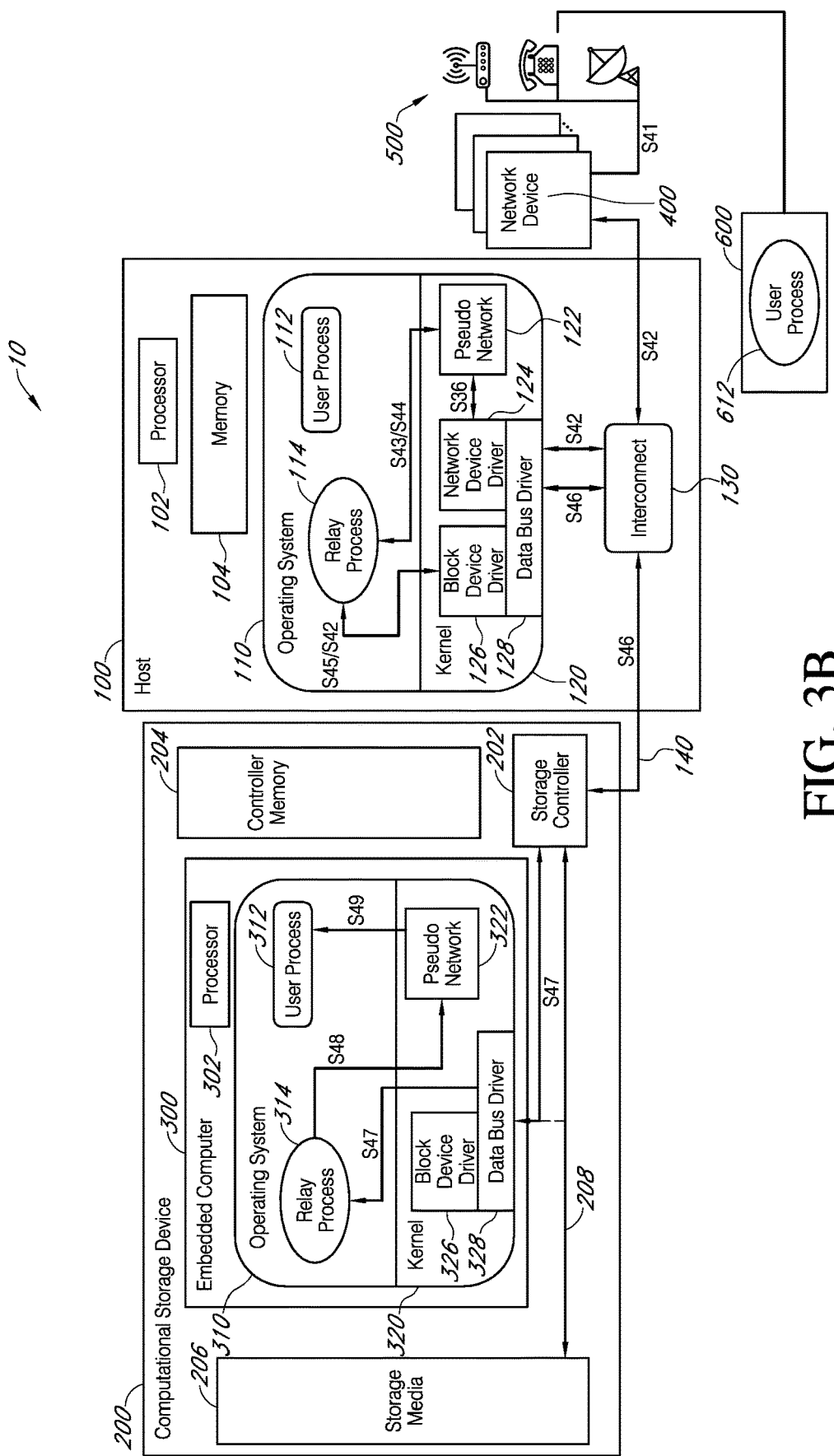
FIG. 3B illustrates a data communication flow from an external device to the embedded computer in the computational storage device, according to some example embodiments of the present invention.

FIG. 3B illustrates a data communication flow from an external device 600 to the embedded computer 300 in the computational storage device 200, according to some example embodiments of the present invention.

When a message arrives at a network device 400 from a communications network 500 (S41), the network device 400 passes the message to the host 100 via a data bus 150 and the data bus driver 128. The host kernel 120 checks the destination address to identify the embedded computer 300 as the final destination of the message.

From this point on, the operations performed to send the message to the appropriate embedded user process 312 running on the embedded computer 300 at the computational storage device 200 is the same or substantially the same as that described above with respect to FIG. 2A for transmitting a message from a local host process on the host 100 to the embedded computer 300. That is, the host kernel 120 forwards the send command to the host pseudo network 122. The host pseudo network 122 is configured to deliver the message, which has a destination address corresponding to the embedded computer 300, to the host relay process 114 (S44). The host relay process 114 encapsulates the message and issues a vendor specific command to the block device driver 326 associated with the embedded computer 300 (S45). Here, encapsulation may include stripping the message of some unnecessary header information, adding tags and/or padding, combining the message with other messages, and/or breaking the message into multiple messages depending on the message size. The data bus driver 128 converts the encapsulated message to a signal for transmission to the computational storage device 200 via the interconnect 130 and the transmission medium 140 (S46).

Once the message is received by the storage controller 202, it determines the destination of the message as either the embedded computer 300 or the storage media 206 based on the type of command received from the host's block device driver 126. For example, the destination may be the storage media 206 when the received command is a nonproprietary write command, and may be the embedded computer 300 when the command is a predefined proprietary vendor-specific command created for transferring messages to the embedded computer 300. The storage controller 202 then forwards the message to the embedded computer 300 (and, e.g., not to the storage media 206). In so doing, in some embodiments, the storage controller 202 writes the message to the operational memory 204, and sends a signal to the embedded relay process 314 of the embedded computer 300 (S47) indicating that a message is available to be read. According to some examples, a signal may be a software interruption, which is a kernel mechanism to send event notifications to user processes or between user processes such as the relay process, or a signal may be a predefined memory address that is used by two processes to notify each other using a mechanism of set/reset. That is, when a first process wants to notify that a message is ready, it sets a value on that memory address, and a second process monitors (e.g., continually monitors) that memory address to know when the message is available. After reading the message, the second process resets the value of the memory address, and the first process checks the memory address for the reset, so that it knows that it can send new notifications. The embedded relay process 314, after stripping down, reassembling or breaking down the message or messages to its original format, then delivers the message to the embedded pseudo network 322 of the embedded computer (S48). The embedded pseudo network 322 finally provides the message transparently to the appropriate embedded user process 312 that corresponds to the destination address of the message (S49).

In embodiments in which the host 100 is communicatively connected to more than one computational storage device, the host kernel 120 may utilize one pseudo network device driver per each computational storage device, as if each of the computational storage devices is connected through a distinct network. As such, according to some embodiments, computational storage devices connected to the same host have no direct connection between themselves, and the host 100 facilitates communication between the computational storage devices by acting as a router relaying messages through its kernel 120 between the different pseudo network device drivers.

Figure 4:
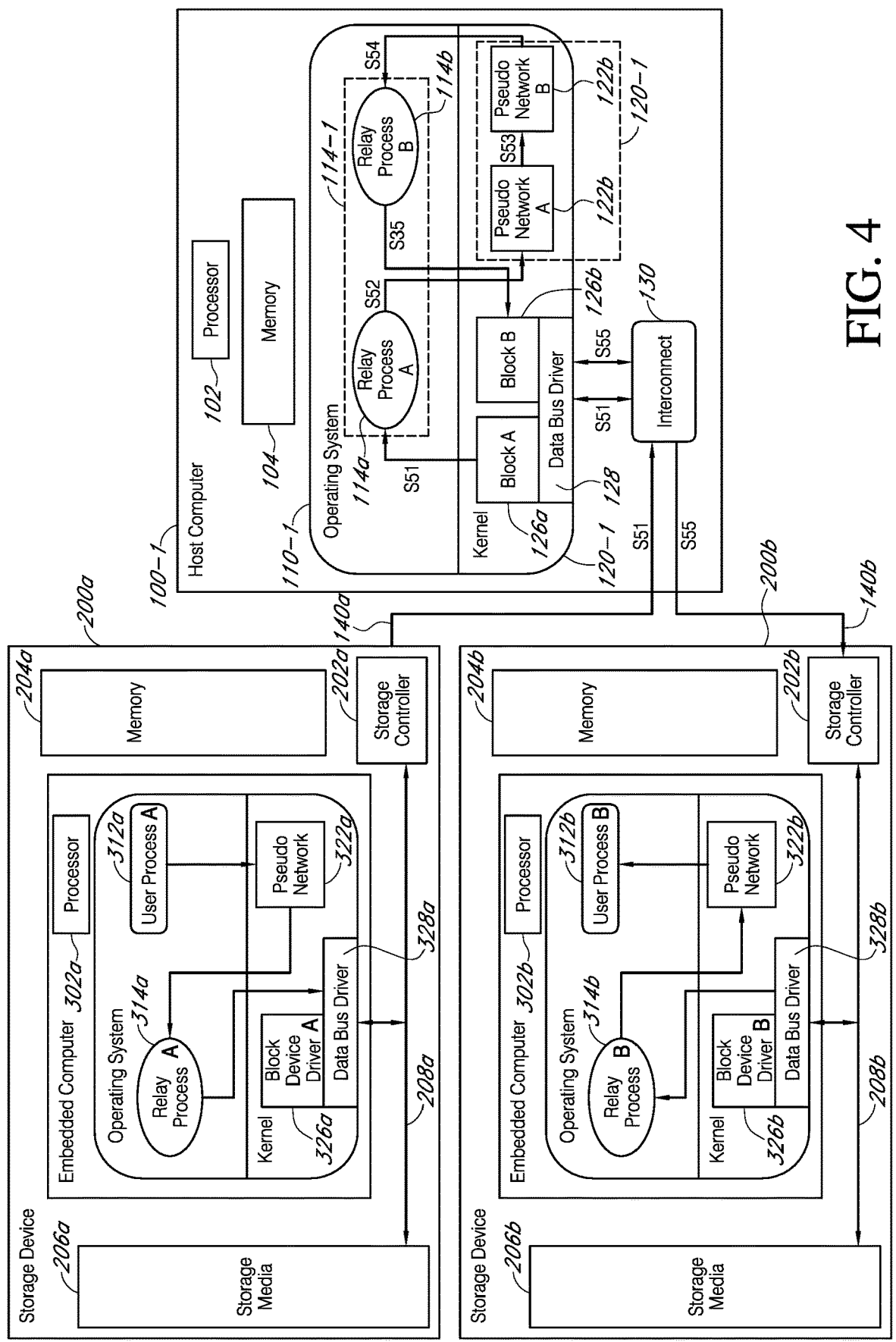
FIG. 4 illustrates a data communication flow from a first embedded computer in a first computational storage device to a second embedded computer in a second computational storage device with a host computer acting as intermediary, according to some example embodiments of the present invention.

FIG. 4 illustrates a data communication flow from a first embedded computer 300a in a first computational storage device 200a to a second embedded computer 300b in a second computational storage device 200b with a host 100-1 acting as intermediary, according to some example embodiments of the present invention. For simplicity of illustration and description, in the example illustrated in FIG. 4, the host (e.g., host computer) 100-1 is connected to two computational storage devices (i.e., the first and second computational storage devices 200a and 200b); however embodiments of the present invention are not limited thereto and the host 100-1 may be connected to any suitable number of computational storage devices.

Each of the first and second computational storage devices 200a and 200b of FIG. 4 may be the same or substantially the same, in function and structure, as the computational storage device 200 described above with reference to FIGS. 1-3B. Similarly, the host 100-1 of FIG. 4 may be the same or substantially the same as the host 100 described above with reference to FIGS. 1-3B, except for the first and second block device drivers 126a and 126b.

In some embodiments, when a host 100-1 is connected to more than one computational storage device, each will have its own associated block device driver. In the example of FIG. 4, the host 100-1 includes a first block device driver 126a and a second block device driver 126b associated with the first computational storage device 200a and the second computational storage device 200b, respectively.

According to some embodiments, the host relay process 114-1 and the host pseudo network 122-1 are capable of handling communications to and from any number of computational storage devices connected to the host 100-1 (e.g., to and from both of the first and second computational storage devices 200a and 200b). In some embodiments, the host relay process 114-1 includes a separate relay process for each of the computational storage devices. For example, in the case of FIG. 4, the host relay process 114-1 includes a first relay process 114a and a second relay process 114b associated with the first computational storage device 200a and the second computational storage device 200b, respectively. In a similar manner, in some embodiments, the pseudo network 122-1 includes a separate pseudo network device driver for each of the computational storage devices. For example, in the case of FIG. 4, the host pseudo network 122-1 includes a first pseudo network 122a and a second pseudo network 122b associated with the first computational storage device 200a and the second computational storage device 200b, respectively.

Referring to FIG. 4, when the first computational storage device 200a has a message destined for the second computational storage device 200b, the first storage controller 202a communicates to the first block device driver 126a corresponding to the first computational storage device 200a and generate a notification to the host relay process 114-1 (S51), in the same manner as described above with respect to FIGS. 2B, 3B and 4.

The host relay process 114-1 reads the message, writes it to the memory 104, and delivers it to the host pseudo device driver 122-1 (S52). In some embodiments, the first relay process 114a receives the notification from the first block device driver 126a, reads the message, writes it to the memory 104, and delivers it to the first pseudo device driver 122a.

The host kernel 120-1 checks the destination address of the message, determines that it corresponds to the second computational storage device 200b In some embodiments, the host kernel 120-1 determines that the second computational storage device 200b is reachable through the second pseudo network 122b, and delivers the message to the second pseudo device driver 122b (S53), which then issues the send command to the second relay process 114b (S54).

the host relay process 114-1 (e.g., the second relay process 114b) issues a command (e.g., a vendor specific command) to the second block device driver 126b (S55), which is associated with the second computational storage device 200b, for transmission to the second embedded computer 300a.

From hereforth, the operational flow proceeds as described above with respect to FIGS. 2A, 3B, and 4B until the message is received by the second user process 312b in the second computational storage device 200b.

Accordingly, as described above, by utilizing and reconfiguring the pseudo network device driver, which is a preexisting/native feature of the kernel, and utilizing a relay process at the software level of the operating system, embodiments of the present invention greatly simplify the implementation of a mechanism for enabling communication between a host and an embedded computer within a computational storage device. Additionally, by utilizing the host as a router, some embodiments of the present invention enable computational storage device intercommunication with other storage and network devices. Further, embodiments of the present invention achieve the above-described goals in a manner that is transparent to user processes at the host and the embedded computer within the computational storage device (i.e., the user processes are unaware of the modifications to the host), and achieved without modifying the host kernel or utilizing custom hardware or communication protocols.

The above-described embodiments employ an existing, operating system, such as Linux, Windows, or the like, with minor kernel coding. However, embodiments of present invention are not limited thereto. In some embodiments, the operating system of the host and/or the embedded computer(s) can be customized such that the user process can communicate directly to the relay process, without the intermediation of the pseudo network device driver, this eliminating the need for the pseudo network (this communication flow is shown as a dashed line in FIGS. 1 and 2A-2B, for example).

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept". Also, the term "exemplary" is intended to refer to an example or illustration.

It will be understood that, although the terms "first", "second", "third", etc., may be used herein to describe various elements, components, and/or sections, these elements, components, and/or sections should not be limited by these terms. These terms are used to distinguish one element, component, or section from another element, component, or section. Thus, a first element, component, or section discussed below could be termed a second element, component, or section, without departing from the scope of the inventive concept.

It will be understood that when an element is referred to as being "connected to" or "coupled to" another element, it can be directly connected to or coupled to the other element, or one or more intervening elements may be present. When an element is referred to as being "directly connected to" or "directly coupled to" another element, there are no intervening elements present.

As used herein, the terms "use", "using", and "used" may be considered synonymous with the terms "utilize", "utilizing", and "utilized", respectively.

The computational system and/or any other relevant devices or components according to embodiments of the present invention described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the computational system may be implemented on a flexible printed circuit film, a tape carrier package (TCP), a printed circuit board (PCB), or formed on the same substrate. Further, the various components of the computational system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, and scope of this invention, as set forth in the following claims and equivalents thereof.

What is claimed is:

1. A method of facilitating communication to an embedded computer in a computational storage device via a host, the method comprising:
    receiving, by a host kernel of the host, a message for transmission to an embedded process running at the embedded computer;
    determining, by the host kernel, that a destination address of the message corresponds to the embedded computer within the computational storage device;
    in response to the determination, forwarding, by a host pseudo network device driver of the host, the message to a host relay process associated with the embedded computer; and
    encapsulating the message, by the host relay process, to generate a proprietary command for transmission to the computational storage device,
    wherein the determining that the destination address of the message corresponds to the embedded computer comprises:
        identifying, by the host kernel, the destination address of the message; and
        cross-checking, by the host kernel, the destination address against a look-up table internal to the host, and
    wherein the encapsulating the message comprises:
        stripping, by the host relay process, unused portions of the message, concatenating more than one message into one or fragmenting one message into multiple messages; and
        reformatting, by the host relay process, the stripped message into the proprietary command that is compatible with a communication protocol of the host and the computational storage device.

2. The method of claim 1, wherein the message is from a host user process local to the host.

3. The method of claim 1, further comprising:
    receiving, by the host relay process of the host, a message from a network device communicatively coupled to an external device; and
    storing, by the host relay process, the message to a host memory and notifying a host pseudo network device driver of availability of the message.

4. The method of claim 3, wherein the network device is communicatively coupled to the external device via a communications network.

5. The method of claim 3, wherein the message is generated by an external user process at the external device and comprises the destination address and data to be processed by the embedded computer.

6. The method of claim 1, further comprising:
    identifying a block device driver of the host that is associated with the embedded computer; and
    sending the proprietary command to the block device driver for transmission to an interconnect of the host.

7. The method of claim 6, wherein the interconnect is configured to convert the proprietary command into electrical signals for transmission to the computational storage device via a transmission medium.

8. The method of claim 1, wherein the encapsulating the message comprises:
    reformatting the message as the proprietary command to be compatible with a communication protocol of the host and the computational storage device.

9. The method of claim 1, wherein the proprietary command is configured to instruct a storage controller of the computational storage device to transmit the message to the embedded computer and not to perform any standard read or write command for transmission of data from or to a storage media of the computational storage device.

10. The method of claim 1, wherein the embedded computer is integrated within the computational storage device.

11. The method of claim 1, wherein the message comprises a destination address of the embedded computer and data to be processed by the embedded computer.

12. The method of claim 1, wherein the host pseudo network device driver is a native feature of the host kernel, and wherein the host relay process resides at a user space level of a host operating system.

13. A method of facilitating communication from a host to an embedded computer in a computational storage device, the method comprising:

receiving, by a storage controller of the computational storage device, a message through a transmission medium;

determining, by the storage controller, whether a destination address of the message corresponds to the embedded computer or a storage media of the computational storage device; and in response to determining that a destination of the message is the embedded computer:

sending, by the storage controller, a signal that a message is available to an embedded relay process associated with the embedded computer, and writing the message to an operational memory of the computational storage device; and forwarding, by the embedded relay process, the message to an embedded pseudo network device driver of the embedded computer for transmission to an embedded user process of the embedded computer, wherein the determining the destination address of the message comprises:

identifying, by an embedded kernel, the destination address of the message; and cross-checking, by the embedded kernel, the destination address against a look-up table internal to the computational storage device, wherein the embedded pseudo network device driver is a native feature of a host kernel of the embedded computer, and wherein the embedded relay process resides at a user space level of an operating system of the embedded computer.

14. The method of claim 13, wherein the embedded computer is integrated within the computational storage device.

15. The method of claim 13, wherein the message comprises the destination address associated with the embedded computer and data to be processed by the embedded computer.

16. The method of claim 13, wherein the message is generated by a host user process at the host.

* * * * *